April 15, 1924.  
A. CONGELLIER  
1,490,591  
MECHANICAL GEAR SHIFTING APPARATUS  
Filed July 3, 1923   3 Sheets-Sheet 1

Witnesses:

Inventor  
A. Congellier  
By
Attorney

April 15, 1924.

A. CONGELLIER 1,490,591

MECHANICAL GEAR SHIFTING APPARATUS

Filed July 3, 1923    3 Sheets-Sheet 2

Witnesses:

Inventor
A. Congellier

Attorney

April 15, 1924.

A. CONGELLIER 1,490,591

MECHANICAL GEAR SHIFTING APPARATUS

Filed July 3, 1923   3 Sheets-Sheet 3

Witnesses:

Inventor
A. Congellier
By
Attorney

Patented Apr. 15, 1924.

1,490,591

UNITED STATES PATENT OFFICE.

ANTON CONGELLIER, OF MILWAUKEE, WISCONSIN.

MECHANICAL GEAR-SHIFTING APPARATUS.

Application filed July 3, 1923. Serial No. 649,198.

*To all whom it may concern:*

Be it known that I, ANTON CONGELLIER, a citizen of the United States, residing at Milwaukee, in the county of Milwaukee and State of Wisconsin, have invented certain new and useful Improvements in Mechanical Gear-Shifting Apparatus, of which the following is a specification.

This invention relates to certain new and useful improvements in mechanical gear shifting apparatus, and the objects are to eliminate the present trouble experienced in shifting gears of motor vehicles driven by internal combustion engines; to provide a device simple in construction and operation which eliminates the usual hand operated shifting lever, and to provide a device which shall be durable and efficient in operation.

Other objects will appear as the nature of the invention is better understood, and the same consists in the novel form, combination and arrangement of parts hereinafter more fully described, shown in the accompanying drawings, and claimed.

Figure 1:
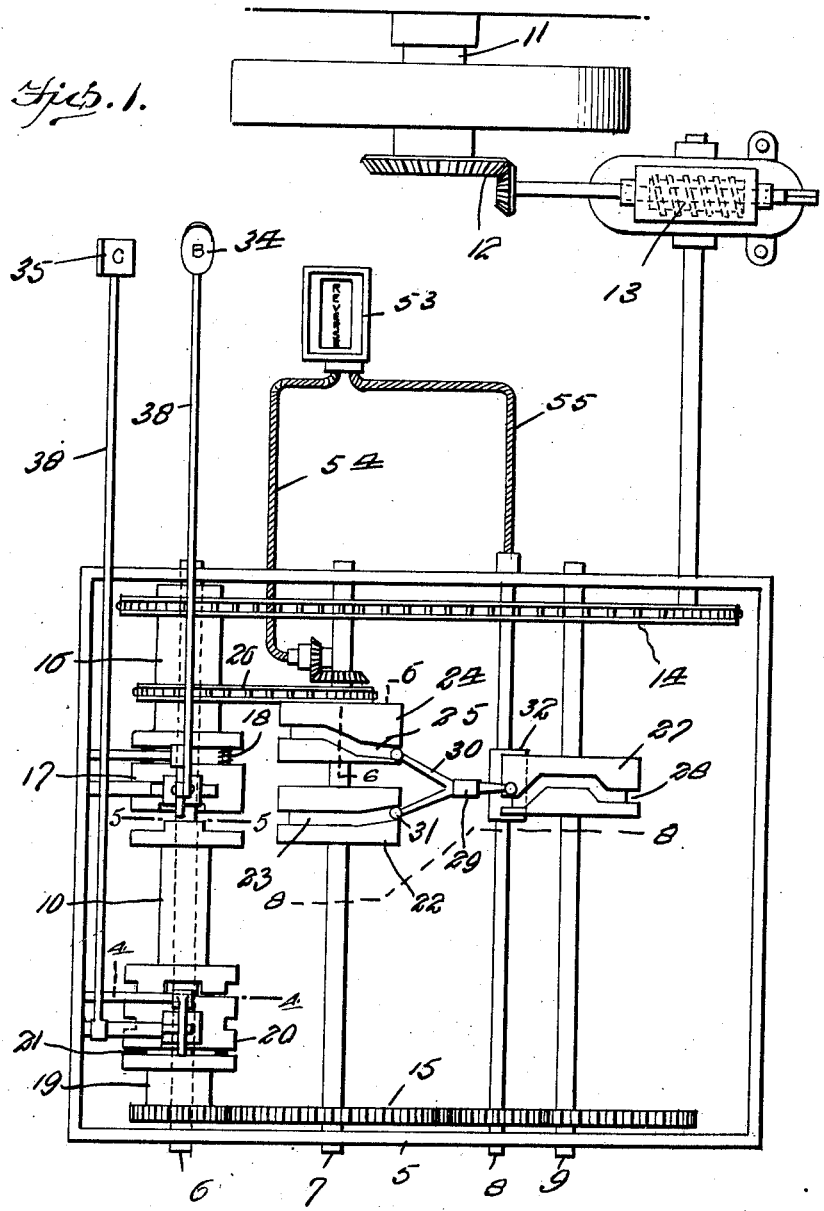
Figure 2:
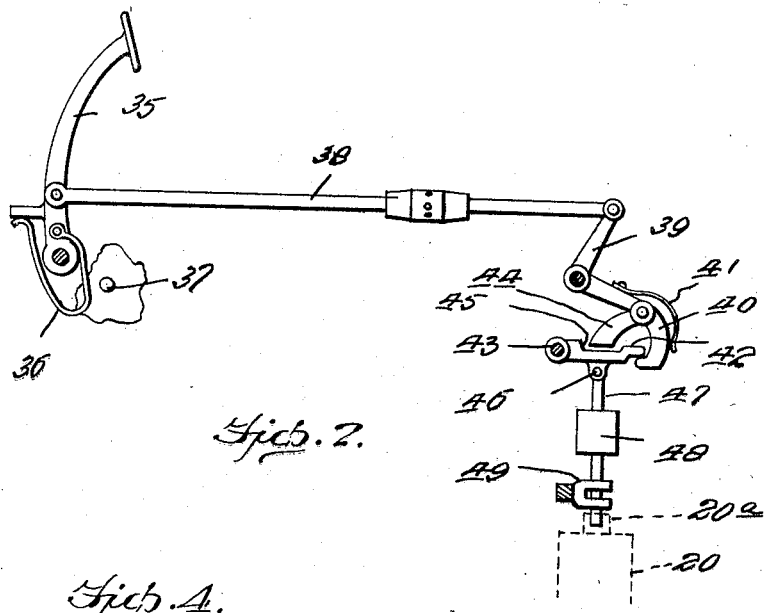
Figure 4:
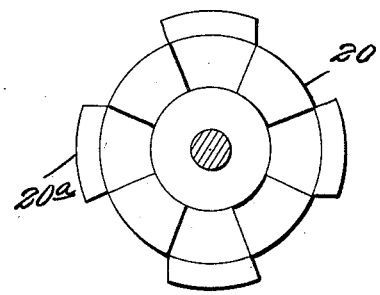
Figure 5:
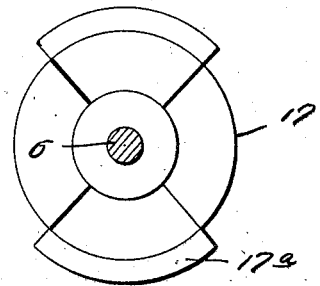
Figure 6:
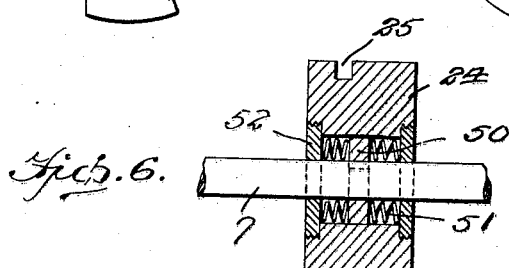
Figure 3:
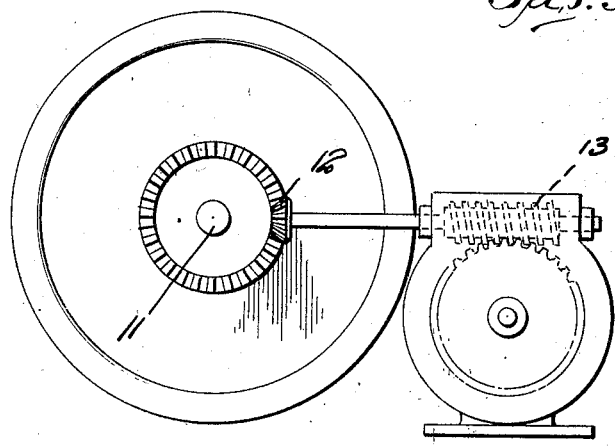
Figure 7:
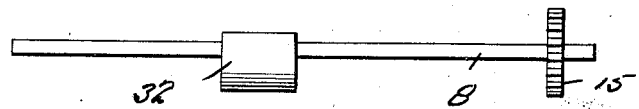
Figure 8:
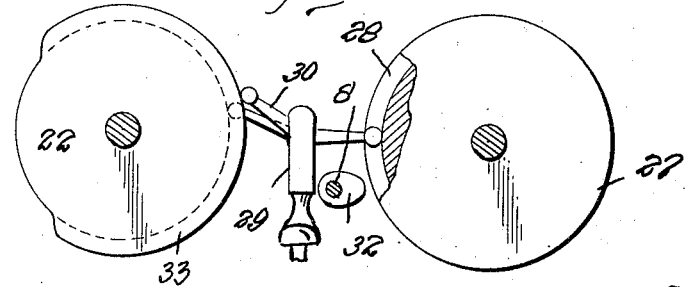

In the drawings, wherein like reference characters indicate corresponding parts throughout the several views, Figure 1 is a top plan view of a mechanical gear shifting apparatus constructed in accordance with the present invention, Figure 2 is a detail view, partly in section and partly in side elevation, showing the pedal operated control device for the spring operated clutch elements, Figure 3 is an elevational view of the driving mechanism of the continuously driven clutch element, Figure 4 is an enlarged sectional view taken substantially on line 4—4 of Figure 1, Figure 5 is an enlarged sectional view taken substantially on line 5—5 of Figure 1, Figure 6 is an enlarged sectional view taken substantially on line 6—6 of Figure 1, Figure 7 is an elevational view showing the operating cam of the gear shifting lever and adjacent parts, and Figure 8 is an enlarged sectional view taken substantially on line 8—8 of Figure 1.

Referring more in detail to the drawings, the invention embodies a suitable casing 5 having a plurality of parallel shafts 6, 7, 8 and 9 journaled therein, a double ended clutch element 10 being suitably fixed upon the shaft 6, and this shaft being driven from the engine shaft 11 through a bevel gearing 12, worm gearing 13 and sprocket gearing 14. The drive is transmitted from the shaft 6 respectively through the shafts 7, 8 and 9 by means of spur gears 15 which mesh with each other and are secured upon the rear ends of these shafts. A sleeve 16 is loose upon the shaft 6 at one end of the clutch element 10, and this sleeve carries a clutch element 17 which is normally urged toward the adjacent teeth of the clutch element 10 by means of the springs 18, these springs being placed around suitable bolts or the like connecting the members 16 and 17 whereby these latter members are driven in unison or held against relative rotation. Another sleeve 19 is loosely arranged upon the shaft 16 at the other end of the clutch element 10, and this sleeve has a clutch element 20 suitably fixed thereto against relative rotation, in a manner similar to the connection of the members 16 and 17, springs 21 being interposed between the members 19 and 20 for urging the member 20 into clutching engagement with the adjacent end of the clutch member 10.

The spring pressed clutch elements 17 and 20 are provided with segmental peripheral cam lugs 17ª and 20ª, respectively, as shown in Figures 4 and 5, the lugs of the member 17 being two in number and the lugs of the member 20 being four in number as clearly shown, in the embodiment of the invention herein illustrated.

A cam drum 22 having a peripheral cam groove 23 is mounted upon the shaft 7 so as to be driven thereby, and another cam drum 24 is loosely disposed upon the shaft 7 beside the drum 22, the drum 24 being provided with a peripheral cam groove 25 and being operatively geared with the sleeve 16 by means of a sprocket gearing 26. Another cam drum 27 is fixed upon the shaft 9 and is provided with a peripheral cam groove 28, while a lever 29 is suitably mounted between the shafts 7 and 8 and is adapted to be operatively connected to the shifting gears of an ordinary transmission mechanism in the usual and well known manner, whereby certain forward or rearward and lateral movements of this lever will effect the change in the speeds. The only essential difference between this lever 29 and the usual hand operated gear shifting lever is that the same is provided with a plurality of arms 30 which have ball shaped ends 31 adapted for selective engagement in the grooves 25, 23 and 28 of the cam drums, so that the proper shifting movement will be given to this lever when these drums are rotated, due to the shape of the cam grooves therein.

As shown in Figures 1, 7 and 8, a cam 32 is fastened upon the shaft 8 beneath the arm of the lever 29 which is operatively associated with the cam drum 27, for swinging the lever 29 in a proper direction and at the required time to disengage the adjacent arm from the groove of the cam drum 27 for returning the gear shift lever 29 to neutral position. It will also be seen that the cam drum 22 is provided with a circumferential raised portion or rib 33 (see Figure 8), for the purpose of tilting the lever 29 for disengaging an arm of the lever from the groove of the cam drum 22 and engaging another arm of said lever with the groove of the drum 24.

The shape of the groove 23 of the drum 22 is such as to provide for the first speed shift of the lever 29, and the groove of the drum 27 is shaped to give the lever 29 a movement to second speed and to third speed, the actuating portion of the groove 28 coming into play when the portion of the groove 23 is such as to have no effect on the lever 29, and vice versa.

The groove of the drum 24 is so shaped as to move the lever 29 in the direction for obtaining reverse drive of the vehicle, and as the vehicle will necessarily have to be at a stop when shifting into reverse, the operation of this drum 24 is placed under the influence of the brake pedal 34, the operation of the drums 22 and 27 being placed under the influence of the usual clutch lever 35. For this purpose, the lever 34 is cooperatively related with the clutch element 17 for causing its disengagement at required intervals, while the clutch pedal 35 is cooperatively related with the clutch element 20 in a similar manner. As the mechanism for controlling the elements 17 and 20 are identical, a description of one of the same will suffice, and this construction is clearly shown in Figures 1 and 2.

Description of the mechanism referred to for controlling the clutch elements 17 and 20 will be confined to the clutch pedal mechanism of Figure 1 when referring to Figure 2, but as the mechanism associated with the brake pedal is similar, it may be read upon either construction. In Figure 2 the clutch pedal 35 is shown as provided with a yieldable element 36 upon its lower end adapted to engage a stop 37 when the clutch is released. This pedal is connected by means of a rod 38 with a bell crank lever 39 having a dog 40 pivoted to one end thereof normally urged by means of a spring 41 into engagement with the free end of an arm 42 which is pivoted as at 43 at its other end for vertical swinging movement, the dog 40 being provided with an arm 44 disposed adjacent a cam lug or shoulder 45 of the arm 42. The intermediate portion of the arm 42 is pivoted as at 46 to the upper end of a rod 47 which is weighted or spring pressed downwardly as at 48 and mounted in a suitable guide 49, the lower end of the rod 47 being disposed in the path of the cam lug 20$^a$ of the clutch element 20. After the yieldable element 36 engages the stop pin 37, a slight further pressure on the pedal 35 will cause the dog 40 to lift the arm 42 and thereby raise the rod 47 out of the path of the lug 20$^a$, thereby permitting the clutch element 20 to be engaged with the adjacent end of the clutch element 10 by means of the springs 21 so that the sleeve 19 may be driven for driving the drums 22 and 27 through the gearing 15. Further pressure on the pedal 35 causes the arm 44 to engage the cam lug or shoulder 45 for swinging the dog 40 out of engagement with the arm 42 so as to permit the rods 47 to automatically lower in the path of the next succeeding cam lug 20$^a$ of the clutch element 20. As the rod 47 engages the cam side surface of this cam lug 20$^a$ the clutch element 20 is forced out of engagement with the adjacent end of the clutch element 10 for thereby discontinuing, automatically, the rotation of the sleeve 19 and the drums 22 and 27. An initial operation of the clutch pedal in accordance with the above will cause the drum 22 to shift the lever 29 for placing the transmission in first speed. A repetition of this operation will cause the drums 22 and 27 to again shift the lever 29 for placing the vehicle in second speed, the said operation of the clutch pedal in this manner causing the rib 32 to swing the lever 29 for engaging one of its arms with the groove of the drum 27 so that the said drum 27 will operate the lever 29 for shifting into third speed upon a third operation of the clutch pedal. A fourth operation of the clutch pedal will cause the cam 32 to engage the adjacent side of the lever 29 for swinging the latter back to neutral position. It will thus be seen that each time the clutch is disengaged before the change in speed is effected, while the gear shifting operation is automatically accomplished through a depression of the clutch pedal. It will also be seen that the change in the gear shifting is made in sequence so that the operator must successively change from neutral to first speed, from first speed to second speed, from second speed to third speed, and then from third speed back to neutral. In other words, the operator is not allowed to shift from first to third speed or to skip any intended successive operation of the gear shift, thereby avoiding wear and tear upon the vehicle driving mechanism which is experienced from this source with the usual hand control.

In a like manner, the depression of the brake pedal 34, will cause the vehicle to come to a stop, so that upon further pressure upon this brake pedal, the clutch element 17 will be allowed to rotate for a part of a revolution so as to drive the drum 24 for shifting the lever 29 into reverse gear operating position. As shown in Figure 6, the shaft 7 has a plate 50 keyed thereon which rotatably fits within the drum 24, and at each side of which is positioned a plurality of flat compression springs 51 which also bear against removable side plates 52 carried by the drum 24. This allows resilient lateral play of the drum 24 so that in case the gears fail to mesh, these springs will allow the drum to rotate and move laterally without effecting the gear shift lever, and to thereby prevent breakage of parts.

A suitable indicator 53 may be driven by flexible shafting 54 and 55 from the shaft 7 and drum 24 for indicating to the driver the condition of the gears i. e., when the same are in either of the forward speeds or in reverse.

Minor changes may be made without departing from the spirit and scope of the invention as claimed.

What I claim as new is:

1. In a mechanical gear shift apparatus, a clutch element, means to place said clutch element in constant driving connection with the engine of a motor vehicle, a second clutch element normally spring pressed into operative engagement with the first named clutch element, a cam drum in constant driving connection with said second named clutch element, said cam drum having a cam groove, a gear shifting lever having a lateral arm operatively engaged in the groove of the cam drum, and means under control of a control pedal of a vehicle for releasing the second named clutch member into engagement with the first named clutch member and for automatically disengaging the second named clutch member from the first named clutch member upon partial rotation of said second named clutch member, said cam groove having successive portions for moving the gear shifting lever to successive gear shifting positions.

2. In combination with a constantly driven clutch element, a plurality of cam drums, a gear shifting lever having lateral arms operatively associated with the grooves of the drums, and means operable upon depression of a conventional pedal of a motor vehicle for intermittently clutching selective ones of said drums with said constantly driven clutch element and for disengaging the same therefrom.

3. In a mechanical gear shifting apparatus, a double-ended clutch element, means for placing said double-ended clutch element in constant driving relation with a vehicle engine, a second clutch element associated with one end of the first named clutch element and normally spring pressed into engagement therewith, a third clutch element normally spring pressed into engagement with the other end of the first named clutch element, a pair of drums in constant driving relation with the second named clutch element provided with peripheral cam grooves, another drum in constant driving relation with the said third named clutch element and having a peripheral cam groove, a gear shifting lever provided with lateral arms, one of which is associated with the cam groove at each drum, one of said pair of drums being of a form to actuate the gear shift lever to first speed position when given a partial rotation and for shifting the lever into operative engagement with the other drum of said pair upon a second actuation thereof, the other drum of said pair being of a form to operate said gear shift lever to second speed position when given an initial partial rotation and for shifting said lever from second to third speed position when given a second partial revolution, cam means for shifting said lever to neutral position from said third named position and in actuation relation with the second named clutch element, said third drum being of a form to operate the gear shift lever to reverse gear position, means under control of the clutch pedal of the vehicle for releasing said second named clutch element into engagement with said constantly driven double ended clutch element and for disengaging the same therefrom upon completion of a partial rotation of the same, whereby successive operations of said clutch pedal will cause successive shifting positions of the gear shifting lever to be assumed in the succession of from first gear to second gear and from second gear to third gear, and means under control of the brake pedal of the vehicle for releasing the said named clutch element into engagement with the adjacent end of the double ended clutch element and for disengaging the same therefrom upon partial revolution thereof, whereby actuation of the said named drum will cause movement of the gear shifting lever to reverse gear position.

In testimony whereof I affix my signature.

ANTON CONGELLIER.